United States Patent
Biehl et al.

(10) Patent No.: US 9,491,588 B1
(45) Date of Patent: Nov. 8, 2016

(54) SYSTEMS AND METHODS FOR MOBILE DEVICE LOCATION VERIFICATION USING BEACONS

(71) Applicant: FUJI XEROX CO., LTD., Tokyo (JP)

(72) Inventors: Jacob Biehl, San Jose, CA (US); Matthew L. Cooper, San Francisco, CA (US); Gerald Filby, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/732,777

(22) Filed: Jun. 7, 2015

(51) Int. Cl.
*H04W 4/04* (2009.01)
*H04W 4/02* (2009.01)
*H04W 4/00* (2009.01)
*H04W 40/24* (2009.01)
*H04W 24/08* (2009.01)

(52) U.S. Cl.
CPC ............ *H04W 4/043* (2013.01); *H04W 4/008* (2013.01); *H04W 4/025* (2013.01); *H04W 24/08* (2013.01); *H04W 40/244* (2013.01)

(58) Field of Classification Search
CPC ... H04W 4/043; H04W 4/008; H04W 4/025; H04W 24/08; H04W 40/244
See application file for complete search history.

(56) References Cited

U.S. PATENT DOCUMENTS 7,024,552 B1 * 4/2006 Caswell et al. ............... 713/155
8,965,411 B1 * 2/2015 Busch-Sorensen et al. ........................ 455/456.3
2010/0067428 A1 * 3/2010 Cordeiro et al. ............. 370/315
2010/0105409 A1 * 4/2010 Agarwal et al. ........... 455/456.1
2015/0003433 A1 * 1/2015 Sinha .................... H04L 63/107
370/338

OTHER PUBLICATIONS iOS: Understanding iBeacon, https://support.apple.com/en-us/H1202880, visited on Jul. 29, 2015.
S. Saroiu et al. Enabling new mobile applications with location proofs. In Proceedings of the 10th Workshop on Mobile Computing Systems and Applications, HotMobile '09.
J. Manweiler et al. Smile: Encounter—based trust for mobile social services. In Proceedings of the 16th ACM Conference on Computer and Communications Security, CCS '09.
B.Carbunar et al. The shy mayor: Private badges in geosocial networks. In Applied Cryptography and Network Security (ACNS) 2012.

(Continued)

*Primary Examiner* — Leon Flores
(74) *Attorney, Agent, or Firm* — TransPacific Law Group; Pavel I. Pogodin, Esq.

(57) ABSTRACT

A computer-implemented method performed in a computerized system incorporating a central processing unit, a localization signal receiver and a memory, the computer-implemented method involving: receiving at least one localization signal using the localization signal receiver; measuring a strength of the received localization signal; using the central processing unit to extract a key from the received localization signal; determining a location based at least on the measured strength of the received localization signal; and validating the determined location using the extracted key. The localization signal may be provided by one or more beacons, such as iBeacons, which may be placed at various locations within a building. The key may be randomly generated and periodically transmitted to the beacons to prevent replay attacks. A ticket issued by a near field communication (NFC) device may be used for additional location validation to prevent tunneling and collusion.

19 Claims, 10 Drawing Sheets

(56) References Cited

OTHER PUBLICATIONS

I. Polakis et al. The man who was there: Validating check-ins in location-based services. In Proc. of the 29th Annual Computer Security Applications Conference ACSAC '13.

M. Portnoi et al. Loc-Auth: Location-Enabled Authentication Through Attribute-Based Encryption. To appear, Networking and Communications (ICNC 2015).

Jacob T. Biehl, Matthew Cooper, Gerry Filby, Sven Kratz. LoCo: A Ready-to-Deploy Framework for Efficient Room Localization using Wi-Fi. Proc. Ubicomp 2014.

Wanying Luo and Urs Hengartner. Proving Your Location without Giving Up Your Privacy. Proc. HotMobile 2010.

T. Moors, M.Mei, and A. Salim. Zone-IT: Using short range communication to control mobile device functionality. Personal and Ubiquitous Computing, 2008.

* cited by examiner

SYSTEMS AND METHODS FOR MOBILE DEVICE LOCATION VERIFICATION USING BEACONS

BACKGROUND OF THE INVENTION

1. Technical Field

The disclosed embodiments relate in general to positioning systems and, more specifically, to systems and methods for mobile device location verification.

2. Description of the Related Art

A long-standing problem in the art has been fast and accurate determination of indoor location. A variety of hardware and software techniques have been created and, especially in recent years, solutions have been proposed that are both reliable and easy to deploy. Many of these technologies enable everyday devices like smartphones and tablets to determine their indoor position. In fact, technologies like Apple's iBeacon framework are beginning to see large adoption, deployment, and use. As a result, a technology foundation is being laid for an explosion of indoor location-enabled applications.

For a broad class of applications, accurate location information provides context to assist or enhance the user's experience. These include points of interest applications, mapping tools, and social presence sharing applications. While an inaccurate or manipulated location would impact the usefulness of these applications, it would not be harmful from the perspective of the service provider. However, there are many other applications in which the accuracy and trustworthiness of the location is integral to the application itself. These include room access, inventory control, and document access solutions whose decisions to permit or deny access to physical or virtual objects have a contextual dimension that includes the user's physical location.

There has been a significant amount of past research and development that has focused on trusted localization. However, much of this work has explored point solutions. For instance, solutions have been developed to provide anonymous but verifiable location check-ins for location-based services, context-based proofs of co-presence that piggyback on existing infrastructure, and systems for creating and verifying secure proofs of (coarse) location in multi-stakeholder WiFi or cellular environments.

As would be appreciated by those of skill in the art, in addition to the aforesaid technological advances, new and improved systems and methods for immediate or retroactive proofs of indoor location supporting a (tunable) variety of assumptions regarding client-side adversarial behavior and client trust in the location-based service would be desirable.

SUMMARY OF THE INVENTION

The embodiments described herein are directed to methods and systems that substantially obviate one or more of the above and other problems associated with conventional localization techniques.

In accordance with one aspect of the inventive concepts described herein, there is provided a computer-implemented method, the method being performed in a computerized system incorporating a central processing unit, a localization signal receiver and a memory, the computer-implemented method involving: receiving at least one localization signal using the localization signal receiver; measuring a strength of the received localization signal; using the central processing unit to extract a key from the received localization signal; determining a location based at least on the measured strength of the received localization signal; and validating the determined location using the extracted key.

In one or more embodiments, the key is randomly generated.

In one or more embodiments, the key is unique.

In one or more embodiments, the received localization signal is provided by a beacon disposed in a room of a building and wherein a second randomly generated key is periodically sent to the beacon.

In one or more embodiments, validating the determined location involves comparing the key extracted from the received localization signal with the second randomly generated key previously sent to the beacon, wherein the determined location is invalidated if the key and the second key are not the same.

In one or more embodiments, validating the determined location is performed on a server and the server is configured to randomly generate the second key and cause the second randomly generated key to be sent to the beacon.

In one or more embodiments, the second randomly generated key is periodically sent to the beacon by a beacon agent, the beacon agent being communicatively coupled with the server.

In one or more embodiments, validating the determined location further involves validating a ticket issued by a near field communication (NFC) device, wherein the determined location is further invalidated if the ticket is invalid.

In one or more embodiments, the ticket is issued by a near field communication (NFC) device in response to receiving a nonce signed using a private key of the computerized system.

In one or more embodiments, the nonce is randomly generated and transmitted by the near field communication (NFC) device and the method further involves receiving the nonce and signing the received nonce using the private key.

In one or more embodiments, the received localization signal is provided by a beacon disposed in a room of a building, wherein the received localization signal includes an identifier uniquely identifying the beacon.

In one or more embodiments, determining and validating the location involves transmitting the beacon identifier, the measured strength of the received localization signal and the extracted key to a central server and receiving the determined location from the central server.

In one or more embodiments, an identity of the computerized system or a user of the computerized system is not provided to the central server.

In one or more embodiments, the determined location received from the central server is signed with a private key of the central server.

In one or more embodiments, the determined location is received from the central server together with a current timestamp.

In one or more embodiments, the received localization signal is provided by a beacon disposed in a room of a building, wherein the localization signal includes a major identifier uniquely identifying the beacon and a minor identifier, the minor identifier including the key that has been randomly generated.

In one or more embodiments, the location is determined with a room-level accuracy.

In one or more embodiments, receiving at least one localization signal using the localization signal receiver involves receiving a plurality of localization signals provided by a plurality of beacons disposed within a building, wherein the location is determined based on the received plurality of localization signals.

In accordance with another aspect of the inventive concepts described herein, there is provided a non-transitory computer-readable medium embodying a set of computer-executable instructions, which, when executed in connection with a computerized system incorporating a central processing unit, a localization signal receiver, a display and a memory, cause the computerized system to perform a method involving: receiving at least one localization signal using the localization signal receiver; measuring a strength of the received localization signal; using the central processing unit to extract a key from the received localization signal; determining a location based at least on the measured strength of the received localization signal; and validating the determined location using the extracted key.

In accordance with yet another aspect of the inventive concepts described herein, there is provided a computerized system incorporating a central processing unit, a localization signal receiver and a memory, the memory storing a set of computer-readable instructions causing the computerized system to perform a method involving: receiving at least one localization signal using the localization signal receiver; measuring a strength of the received localization signal; using the central processing unit to extract a key from the received localization signal; determining a location based at least on the measured strength of the received localization signal; and validating the determined location using the extracted key.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement a system and method that provide a broad set of security and privacy affordances while still being compatible with existing, off the shelf devices.

Figure 1:
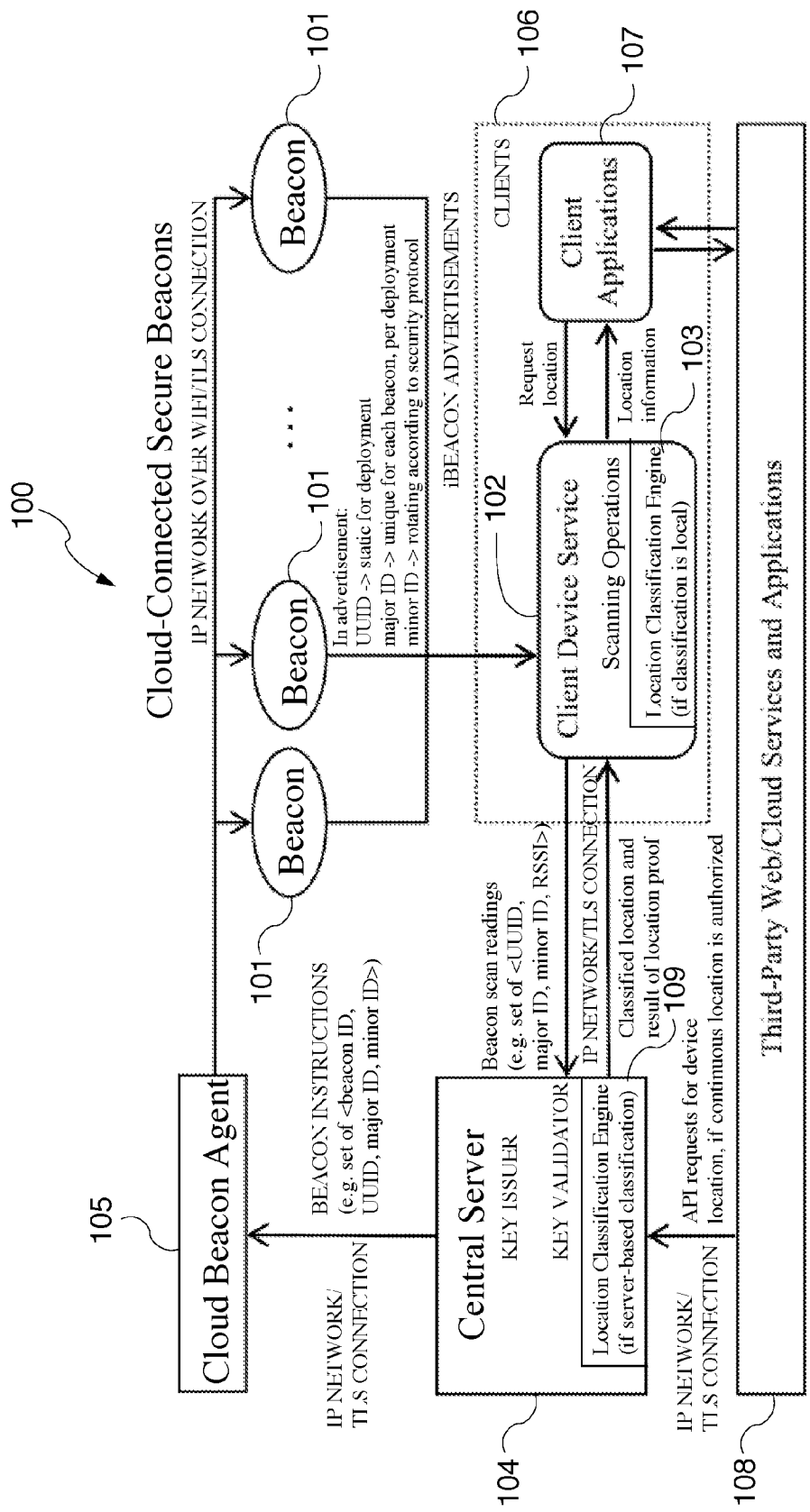
FIG. 1 illustrates an exemplary logical diagram of an embodiment of a localization system described herein.

FIG. 1 illustrates an exemplary logical diagram of an embodiment of a localization system 100 described herein. In one exemplary embodiment, the localization system 100 incorporates five principal components: a deployment of a plurality of cloud-connected beacons 101, a client service for devices 102, a location classification engine (LCE) 103, a central server 104 with server-deployed LCE 109, and a cloud beacon agent (CBA) 105. It should be noted that in one embodiment, the location classification engine 103 is deployed on the client 106. In an alternative embodiment, the location classification engine 109 is deployed on the central server 104.

Cloud-Connected Secure Beacons

In one or more embodiments of the localization system described herein location estimates are determined through the collection of signal strength measurements from a plurality of fixed beaconing devices 101, shown in FIG. 1. While measurements from a variety of radios can be used, an embodiment of the described system 100 relies on Bluetooth Low Energy devices, well known to persons of ordinary skill in the art, to maintain compatibility across a wide-range of existing devices. It should be noted, however, that other types of beaconing devices 101 may be used to facilitate location estimation and, therefore, the described system is not limited to any specific type or types of beaconing devices.

Figure 2:
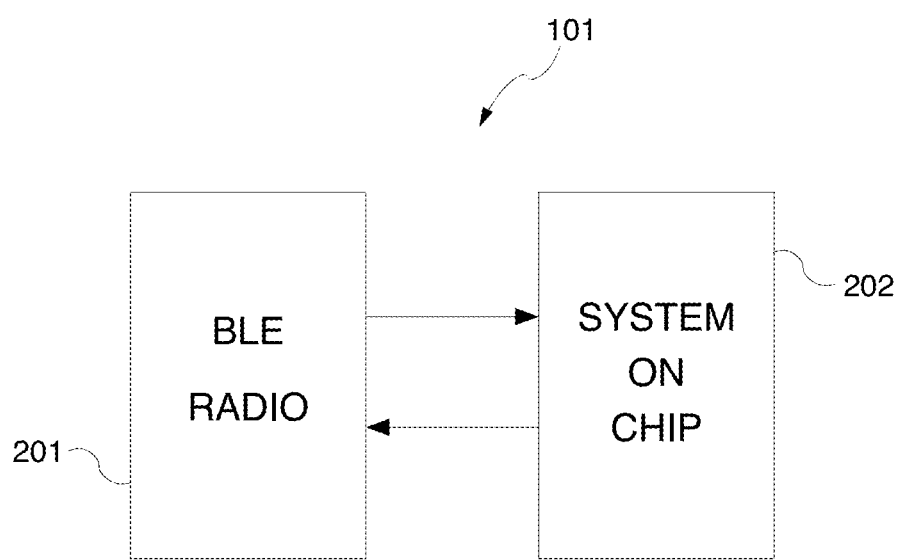
FIG. 2 illustrates an exemplary embodiment of a secure beacon.

FIG. 2 illustrates an exemplary embodiment of a secure beacon 101 that is comprised of two hardware components—a Bluetooth Low Energy (BLE) radio 201 and a WiFi enabled system on a chip (SoC) 202. In one or more embodiments, the SoC 202 communicates securely with a Cloud Beacon agent (CBA) 105 (FIG. 1) that allows its software and functionality to be updated at regular intervals. The SoC 202 device also controls the state of the Bluetooth radio 201 through an ICT bus connection. In one exemplary embodiment, the beacon device 101 is powered by four AA 1.5V batteries that are power regulated to 3V output. Under normal use, this should power the beacon for at least a year.

In one or more embodiments of the localization system 100 described herein, the cloud beacon 101 operates in two modes: beacon mode and update mode. In the beacon mode, the system on a chip 202 is placed into sleep state and the Bluetooth radio 201 is programmed to wake every 2000 ms to transmit an iBeacon compatible advertisement. In one embodiment, this advertisement contains three main segments: a UUID that associates the device to specific services or capabilities, major ID, and minor ID. The UUID is used to identify the beacon 101 as a beacon of the localization system 100. The major ID is used to uniquely identify each beacon 101. This ID is used by the location classification engine 103 along with the received signal strength of the beacon 101 to determine a device's location. Finally, the minor ID is used to provide cryptographic material used by the location authority, described in further detail below.

In one or more embodiments, in the update mode, which occurs at fixed, but configurable intervals, the system on a chip (SoC) 202 connects to the CBA 105 to download new beaconing assignments. In this state, all the parameters of the iBeacon advertisement can be updated. When the beacon 101 is deployed this operation normally configures a new minor ID which is a new unique key provided by the location authority.

Client Service for Devices

In one or more embodiments, a simple service runs on client devices 106 that collect BLE signal measurements. The aforesaid service periodically captures and records all nearby location advertisements. These records include the aforesaid UUID, major ID, and minor ID along with a measurement of the received signal strength indication (RSSI) of the advertisement.

In one embodiment, the client device service 102 in deployed on an iOS computing platform 106. As would be appreciated by persons of ordinary skill in the art, iOS supports a limited set of use cases where background execution of ma process is permitted. The iBeacon proximity/ranging functionality is one such case. iOS 8 allows continuous monitoring for proximity to a known set of beacon regions that are defined as an individual or set of UUIDs. Once the iOS device is receiving iBeacon advertising packets over BLE an in region event is forwarded to the client device service 102, which has previously registered for such notifications. Once the device is in range of the beacons, the client device service 102 can initiate continuous ranging to the beacons—even when the application is in the background state. Ranging consists of a RSSI, UUID, major ID & minor ID values for each visible beacon.

In another embodiment, the client device service 102 in deployed on an Android computing platform 106. The client device service 102 is configured to execute in a background mode and is set to scan periodically for known UUIDs. If found, the client device service 102 records the beacon's RSSI, UUID, major ID, and minor ID. In one or more embodiments, the client device service 102 can adjust the frequency in which it scans. This enables the described localization application to adjust how often it provides location updates.

In one or more embodiments, once a set of scan records is collected, the client device service 102 provides this information to the location classification engine (LCE) 103. In various embodiments, the LCE 103 can perform classifications on the client device (local) 106, or the client 106 can send the scan information to a server-based instance of the LCE 109 deployed on the central server 104, see FIG. 1. As will be discussed in detail below, a client-only implementation (LCE 103) provides the ability for the client's location to be determined without disclosing it to third parties (maintain location privacy) while using a cloud-based LCE 109 allows the computation to be offloaded and shared across multiple services.

Location Classification Engine (LCE)

In one or more embodiments, the location classification techniques utilized by the described system, are based on the ensemble learning method of boosting described, for example, in Freund, Y., Schapire, R.: A decision-theoretic generalization of on-line learning and an application to boosting. Journal of Computer and System Sciences 55(1), 119-139 (1997) and 11. Hastie, T., Tibshirani, R., Friedman, J., The Elements of Statistical Learning, Springer, New York, 2001. In contrast to more common matching methods such as described in Bolliger, P. Redpin—adaptive, zero-configuration indoor localization through user collaboration. In Proceedings of the ACM international workshop on Mobile entity localization and tracking in GPS-less environments, (MELT 2008), pp. 55-60, boosting provides similar classification accuracy without requiring the storage of a search data structure that grows with the training set size. Further, boosting performs most of the computation in offline training, allowing for classification runtime performance to be orders of magnitude faster compared to matching approaches, see for example Biehl, J. T., Cooper, M., Filby, G., Kratz, S. LoCo: A Ready-to-Deploy Framework for Efficient Room Localization using Wi-Fi. In Proceedings of the ACM Conference on Ubiquitous Computing (Ubicomp 2014).

In one or more embodiments, the location classification engines 103 and/or 109 seek to provide location relative to a discrete spatial quantization, or more generally rooms (e.g., personal office) or locations of interest (e.g., near a landmark in a large space). In one or more embodiments, for each discrete location, a binary classifier is constructed that outputs a score representing the probability that the RSSI scan vector S was observed in that room/location:

$$F_{room}(S) = \Sigma_m \alpha_m h_m(S)$$

In one or more embodiments, each per-room classifier combines "weak learners", $h_m$ according to the scalar weights $\alpha_m$. The weak learners are decision stumps that compare a scalar feature to a threshold $\theta_m$:

$$h_m(s) = \begin{cases} 1 & X_m \geq \theta_m \\ 0 & \text{otherwise} \end{cases}$$

In training, the thresholds $\theta_m$ are tuned to minimize error. The feature vector is defined to consist of elements $X_m$ and is computed from each RSSI vector S below.

In one or more embodiments, given the observed RSSI vectors, the set of unique pairwise differences (margins) between the vectors' elements is computed. For an environment with B total beacons, the resulting margin feature vectors have size 0.5·B·(B−1). Intuitively, these features express coarse order information for the pairs of beacons. The RSSI vector $S \in \mathbb{R}^B$ is transformed into a margin feature vector with elements:

$$X_m = S(a_m) - S(b_m),$$

for $a_m, b_m \in \{1, \ldots, B\}$. Missing RSSI values for specific beacons in the training set are set to a nominal value, $R_{min}$ to indicate they were not visible to the mobile client 106. Thus, the fact that specific beacons 101 are not visible at specific locations is incorporated into the features.

In one or more embodiments, the margin features computed from the training scans form the input to classifier training. Each scalar margin feature corresponds to a weak learner ($h_m$) available for inclusion in any per-room classifier $F_{room}(S)$. The training procedure identifies a location-specific set of weak learners that best discriminates that location from all others. The weak learners and their relative weights ($a_m$ in the equation above) for each per-location classifier are learned in a greedy iterative procedure that optimizes error using a per-sample weighting over the training data, as described, for example in Hastie, T., Tibshirani, R., Friedman, J., The Elements of Statistical Learning, Springer, New York, 2001.

In one or more embodiments, for location determination, a one versus all formulation is used. The estimated room is simply the maximum scoring room among the set of per-room classifiers when applied to a test scan $S_{test}$:

$$\text{room}^*(S_{test}) = \text{argmax}_{room} F_{room}(S_{test})$$

In one or more embodiments, only the required set of RSSI differences that were selected in classifier training are computed. These differences are compared to the thresholds ($\theta_m$) and then combined linearly.

Central Server and Cloud Beacon Agent

In one or more embodiments, the central server 104 is a trusted entity that is responsible for coordinating the state of the beacons 101, performing location classification using the location classification engine 109 (when not performed on the client device 106 using the location classification engine 103), verifying proofs of location, and providing third-party applications an API to leverage location information.

In one or more embodiments, each beacon's 101 state (e.g. what it advertises to clients 106) can be changed. For each location deployment, the central server 104 makes a periodic call to the cloud beacon agent (CBA) 105 to set each beacon's 101 UUID, major ID, and minor ID values. The central server 104 ensures that a unique minor ID is set for each beacon 101, at each deployment location. As will be described in detail below, in one or more embodiments, a rotating minor ID is used as part of the location proof protocol. The central server 104 generates and maintains a list of current minor/major ID pairs and, with a location determination, compares keys as part of the proof of location when scans are submitted for location verification.

In one or more embodiments, a third-party API is also provided by the central server 104. With a unique API access key, external web/cloud services and applications 108 are able to make REST-style requests to the central server 104 for a location of the client devices 106.

Secure Proofs of Location

Several dimensions whose variation alters the requirements placed upon a secure localization service will now be described. To enable applications supporting many settings along these dimensions, the specific threat models will be described, together with protocols that have been developed to build unforgeable location proofs in these settings.

Dimensions of Localization

By considering the needs of common location-aware applications, the following four dimensions of secure localization that guided the development of the described localization system have been identified.

Contextual Benefactor. In some applications, the client is the only expected benefactor of the use of location context (e.g., awareness applications describing events near the user's present location). In others, the service may also benefit from the use of client context (e.g., physical/digital access control systems).

Client Threat Model. There are several levels at which a location-based service can place trust in the clients using the system. Clients may be trusted to report their location faithfully; this is useful in, e.g., POI applications that require client location to process requests that have no security implications. It may be the case that clients are not fully trusted, and may try to replay contextual measurements to appear as if they are located in a prior location. For example, a user may launch a replay attack from home to appear as if they are in their office in an attempt to access on-site resources. Finally, clients may be untrusted by the location-based service. These clients may collude in an attempt to carry out wormhole attacks in which a device or user in one location relays contextual measurements to a device or user in another location to defeat location-based protections.

Client Expectation of Privacy. In some cases, clients may agree to remain identifiable to a location-based service; e.g., this is a common assumption in physical access control systems where user accountability is required. In other cases, clients may wish to mask their identity from the service; e.g., a POI service has little reason to know the identity of its requesters.

Time of Proof Disclosure. For most location-based applications, proofs of location will be disclosed immediately. For others, however, it may be the case that retroactive proofs of location are required.

In the remainder of this description, an abbreviated notation to describe combinations of choices from these dimensions will be used. For example, a physical access control service for personal offices would likely operate within the S-R-I-I setting, which indicates that: the service is the primary contextual benefactor, the client may be expected to launch replay attacks against the service, the client agrees to remain identifiable to the service, and the proof of location is to be disclosed immediately.

TABLE 1

|  |  | Trusted | Replay | Untrusted |
|---|---|---|---|---|
| Identifiable | Immediate | ✓ | ✓ | ✓ |
|  | Retroactive | ✓ | ✓ | ✓ |
| Masked | Immediate | ✓ | ✓ |  |
|  | Retroactive | ✓ | ✓ |  |

In this description, several configurations of the localization system 100 that support indoor localization applications along several of the above dimensions will be discussed. In the above Table 1, all cells in the "Trusted" column as well as cells in the first two rows in the "Trusted", "Replay" and "Untrusted" columns indicate settings of primary interest, while check marks indicate settings in which the protocols described herein can be used. It should be noted that the below description focuses primarily on situations in which the client is either completely trusted by the location service (*-T-*-*) or in which the client is untrusted but identifiable (S-R/U-I-*), as these parameterize a large number of interesting location-based applications for the workplace (e.g., controlling access to physical or virtual resources, location-based personalization, etc.).

Threat Model

The threat model that forms the basis of the design of an embodiment of the localization system 100, and provides details about the protocol extensions that have been developed to counter these threats.

In one or more embodiments, the localization system 100 is a distributed system consisting of five key (classes of) entities: the central server 104, a network of cloud connected secure beacons 101, a cloud beacon agent 105 that is used to control these beacons 101, a location classification engines 103 and 109 that determine a device's location, and client device services 102. Additionally there are third-party location-enabled applications/services serviced by the application program interface (API) of the localization system 100. The behavior of the above entities will now be described in detail.

In one or more embodiments, the central server 104 communicates regularly with both client device services 102 (to collect scans, and in some cases carry out client localization), and the cloud beacon agent 105 (to manage the network of smart beacons). In one or more embodiments, all communication with the central server 104 takes place over TLS-protected connections to ensure that traffic is protected against replay, reorder, modification, and observation attacks. It is assumed that the central server 104 correctly classifies client locations using the LCE 109 described above. Clients 106 may or may not be willing to disclose their identity to the central server 104.

In one or more embodiments, the cloud beacon agent 105 is responsible for asynchronously managing the network of smart beacons 101 on behalf of the central server 104. Server-to-agent communications are TLS-protected, and the cloud beacon agent 105 will only accept beacon control messages from the central server 104.

In one or more embodiments, cloud-connected secure beacons 101 periodically establish bidirectional communication with the cloud beacon agent 105 to update their configurations, and also periodically broadcast iBeacon-compatible advertisements that are observed by the client applications 107. All communications between the cloud beacon agent 105 and the SoC 202 running on each beacon 101 are TLS protected, and beacons 101 are configured to accept control messages only from the cloud beacon agent 105. The beacon 101 is trusted to adhere to any configuration changes mediated by the cloud beacon agent 105, although incorrect behavior is easily detectable.

In one or more embodiments, the client device service 102 collects BLE advertisements in order to localize (either unilaterally, or with server assistance) and may use the determined location either on the client device 106 running the client applications 107 or in conjunction with a third party location-enabled application/service 108. The degree to which the central server 104 and location-enabled applications 108 trust a client 106 may vary as described above. In order to enhance the security, in one or more embodiments, each client device 106 has a unique public/private key pair and private keys are not shared between clients 106.

In one or more embodiments, location-enabled applications 108 make use of client device 106 locations classified by the localization system 100 to provide services to client applications 107. Clients 106 may or may not wish to disclose their identity to these location-enabled applications 108, and the applications 108 may have varying levels of trust in clients 106. The levels of trust assumed here parameterize the type of location proof that is to be produced by the client application 107 in conjunction with the localization system 100's central server 104.

Location-Based Services Supported by Localization System

As stated above, in one or more embodiments, that localization within the localization system 100 is based upon RSSI values associated with BLE advertisements transmitted by a network of beacons 101 that are tightly coupled to the central server 104. To determine their room-level location, a client application 107 carries out a 15-second scan that generates a report containing a set of <UUID, major ID, minor ID, RSSI> tuples. These tuples are then fed into a classifier to determine the locations of the client 106.

In one or more embodiments, in the event that the location classification engine 103 is run on the client 106, the localization system 100 can provide location services to applications in any C-*-*-* setting: since the client 106 classifies their own location, this suppresses the Client Threat Model and Client Expectation of Privacy dimensions, and clients 106 can use locally-classified locations immediately or store them for retroactive reference.

Figure 3:
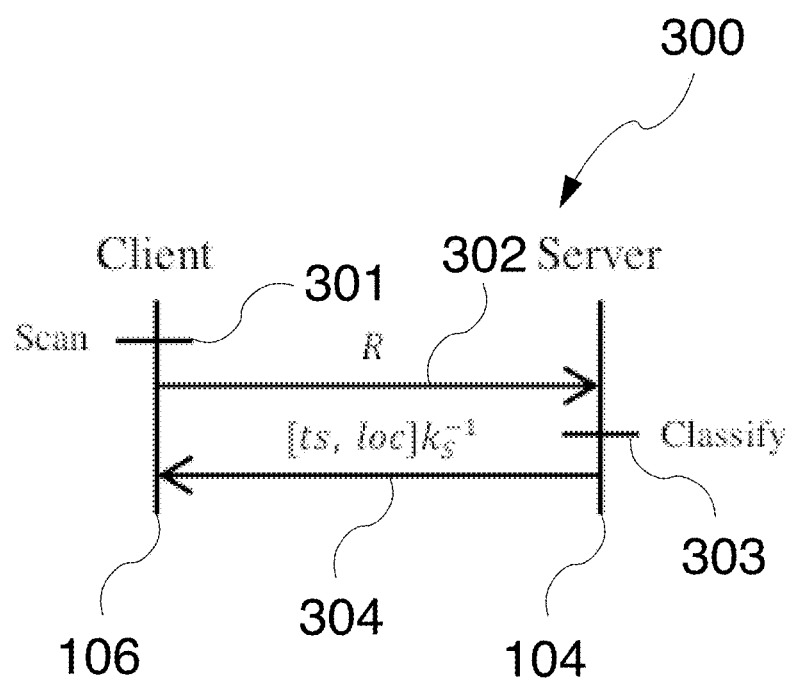
FIG. 3 illustrates an exemplary protocol for providing location information by the central server to the client devices.

In the event that the location classification engine 109 is run on the central server 104, the localization system 100 may be configured to provide location services to applications in any of the S-T-M-* settings, as illustrated in protocol 300 of FIG. 3. With reference to this figure, at step 301 the client 106 performs a scan for the beacons 101 and subsequently sends a request 302 containing the scan data to the central server 104. At step 303, the location classification engine 109 of the central server 104 classifies the location of the client 106 based on the scan data received from the client 106. The central server 104 returns a timestamp and the location information back to the client 106, see 304.

Figure 4:
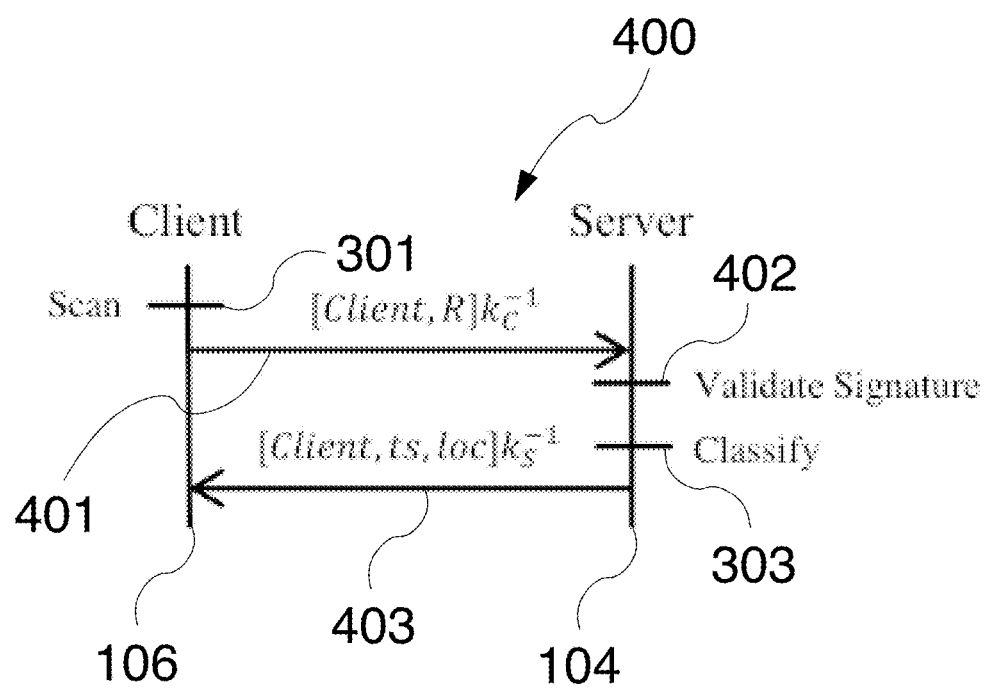
FIG. 4 illustrates another exemplary protocol for providing location information by the central server to the client devices.

Because the client device 106 is fully trusted by the central server 104 in this setting, scan reports can be disclosed either immediately or retroactively to allow the central server 104 to classify the position of a masked client. The addition of a digital signature binding a scan report to a registered user identity, as shown in FIG. 4, allows the localization system 100 to service applications in the S-T-I-* settings. With reference to protocol 400 of FIG. 4, at step 301 the client 106 performs a scan for the beacons 101 and subsequently sends a request 401 containing the digital signature of the client as well as the scan data to the central server 104. At step 402, the central server 104 validates the client's signature and, at step 303 performs the client location classification. Subsequently, the client identity, the timestamp and the location information are sent back to the client 106 at step 403.

Additional Protections

The relatively static nature of scan reports implies that the baseline variant of the localization system 100 cannot provide location services to applications in the S-R-*-* or S-U-*-* settings, as clients 106 can easily replay old reports or collude to carry out wormhole attacks. Thus, two exemplary enhancements to the localization system 100 aimed at overcoming this limitation will now be described.

Preventing Replay Attacks

As would be appreciated by persons of ordinary skill in the art, replay attacks against the localization system 100 are made possible due to the relative stability of the BLE infrastructure visible at a given location over time. As a result, the <UUID, major ID, minor ID, RSSI> tuples comprising a location report are also relatively stable and easily replayed by miscreant users wishing to forge their current location. To combat these attacks, the entropy of these reports needs to be increased in order to make replay and context guessing attacks more difficult to carry out.

To this end, in one or more embodiments, the localization system 100 is configured to randomly perturb the BLE advertisements transmitted by the beacons 101. The iBeacon-compatible advertisements transmitted by the beacons 101 contain a fixed iBeacon prefix, a 128-bit UUID, a 16-bit major ID, and a 16-bit minor ID. Since altering the UUID transmitted by a given beacon 101 would have the effect of confusing mobile applications attempting to leverage iBeacon functionality, and the location classification engine is already leveraging the minor ID, the localization system 100 instead is configured to perturb the 16-bit minor ID of the advertisement.

As stated in detail above, in one or more embodiments, the central server 104 asynchronously updates beacons 101 on a configurable basis (typically every two minutes in one exemplary deployment). As part of this update process, the localization system 100 computes a randomized number to be placed in the minor ID field on a per-beacon basis according to the following formula:

$$\text{HMAC-SHA1}(mk, mac_i, ts)[1 \ldots 16]$$

The above extracts the first 16-bits of the output of the HMAC digest of a 160-bit master key known only to the localization system 100, the MAC address of a particular beacon 101, and the current timestamp. Each beacon 101 thus receives a new, unique, and cryptographically randomized minor ID at each update cycle. Although the strength of protection afforded by this randomized minor is dependent on the frequency of updates and the number of beacons 101 seen in a given location report, this simple exemplary mechanism is a key building block in providing unforgeable proofs of location in the S-R-*-* and S-U-*-* settings.

Preventing Tunneling and Collusion

It should be noted that even with the randomized minor IDs described above, it is possible for an off-site entity to collude with an on-site entity to create a forged location proof: the on-site entity can simply create a location report and forward it to the off-site entity, who can then forward it to the central server 104 to forge a proof of location. To combat this, the localization system 100 must create a binding between the device requesting a proof of location, and the physical space containing the target (fine-grained) location.

Figure 5:
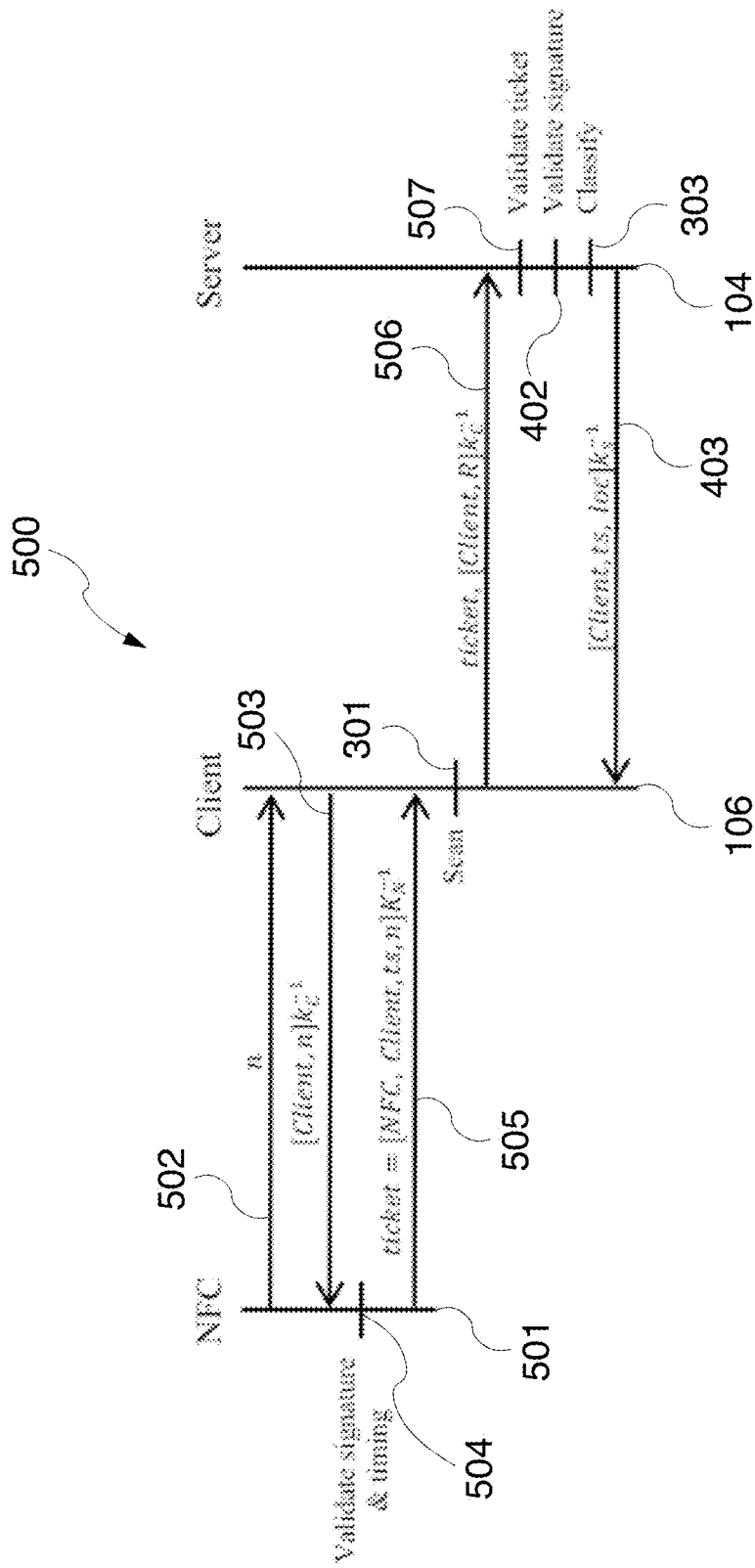
FIG. 5 illustrates an exemplary embodiment of a protocol that creates a binding via the use of the near field communication (NFC) technology.

FIG. 5 illustrates an exemplary embodiment of a protocol 500 that creates this binding via the use of the near field communication (NFC) technology, well known to persons of ordinary skill in the art. To enable the use of this protocol, the localization system 100 additionally incorporates a (coarse) deployment of NFC-equipped stations 501 that can be used to localize a client device 106 to a region within a building. The NFC station 501 first transmits a random nonce 502 to the client device 106, who signs and returns the nonce to the NFC station, see 503. The NFC station 501 then checks (i) the validity of the signature and (ii) that the time taken by the client device 106 to generate the signature is short enough to preclude wormhole attacks to an off-site signer (e.g., <8 ms), see step 504. The NFC station then generates and transmits to the client 106 a coarse location ticket 505 for the client device 106 that includes the identity of the NFC station, the client device 106's identity, the random nonce, and the timestamp at which the ticket was generated, which proves that the client device 106 was present at the coarse location of the NFC station at the specified timestamp.

In one or more embodiments, the client device 106 can send the location ticket and a location scan report to the central server 104, see 506, which can validate the ticket, see step 507, to ensure that the client device 106 whose coarse presence was proved via NFC matches the client device 106 that signed the location report that will be used to classify a fine-grained location. The remaining steps in FIG. 5 are similar to those of the previous two figures and are numbered accordingly. As will be explained in detail below, the combination of this mechanism and the randomized addressing scheme described above enables the successful construction of unforgeable proofs of location in the S-U-I-* settings.

The impact of the beacon 101 density on the entropy provided by the aforesaid randomized advertisement approach, and the security guarantees of the protocols described hereinabove will now be addressed.

Beacon Density Analysis

Figure 6:
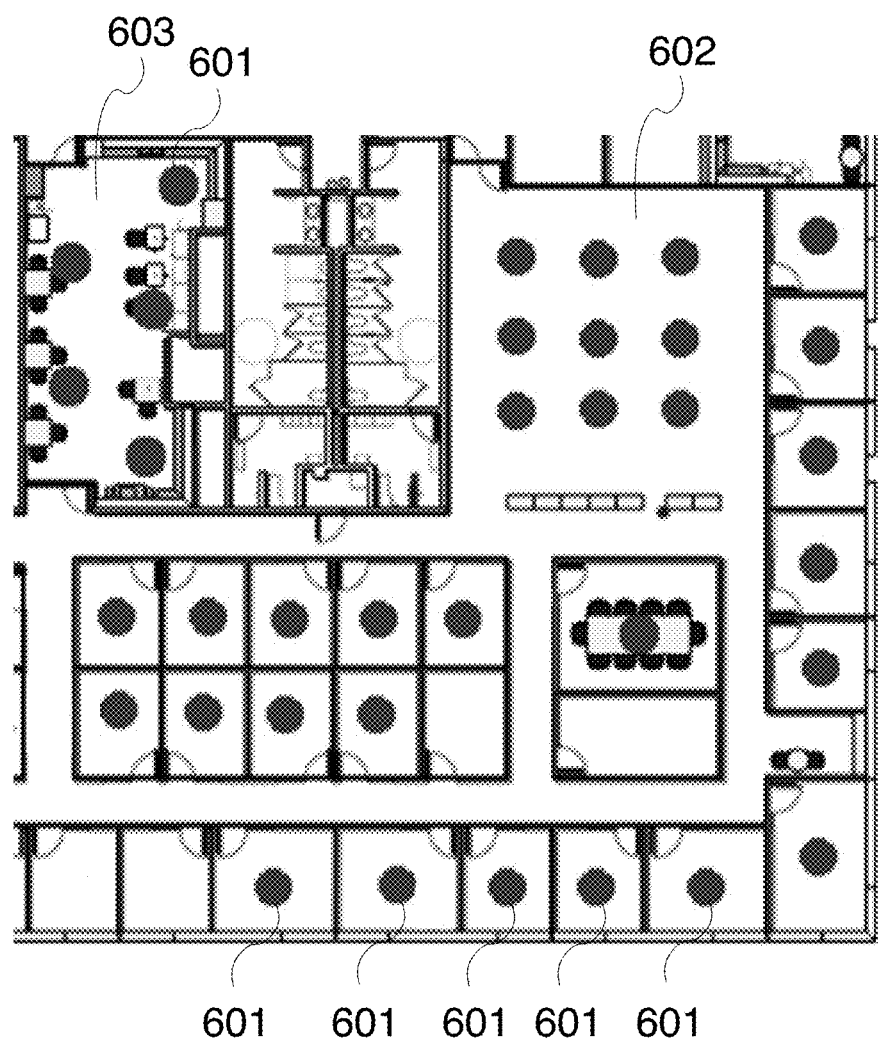
FIG. 6 illustrates an exemplary deployment of beacons in an office environment.

As detailed above, the strength of protection provided by the described embodiment of the scheme depends in part on the number of beacons 101 that are visible in a location. To better gauge this parameter, in one exemplary embodiment, 35 BLE beacons 101 have been deployed, one each per location of interest, in a portion of an office depicted in FIG. 6. In FIG. 6, each beacon 101's location is indicated by a dot 601. It should be noted that the exemplary beacon deployment illustrated in FIG. 6 includes sub-room locations in an open space that is divided into a 3×3 grid with 2.5 m spacing. This example includes total of 23 rooms, most of which are 9 m$^2$ square offices. The hallways are 1.5 m wide, and the deployment also includes a conference room 602 and kitchen 603 (upper left).

In one test, several sets of statistics were collected to better ground parameters governing the strength of the security protections offered by the localization system 100. The dataset that was assembled was collected using an Android mobile war drive, and contains 20 scans per location for a total of 695 scans. Using all of the BLE beacons 101 for classification, an accuracy of 93% has been achieved in a three fold cross validation experiment. Simply using the map of FIG. 6 and estimating the client device 106's location as the location corresponding to the BLE beacon 101 with highest RSSI in each test scan produces a classification accuracy of 59% in the described exemplary deployment.

In the described beacon configuration, on average, 29.81 beacons 101 were visible in the scans taken from each location (s.d.=3.17, min=23.2). These numbers provide a reference set of parameters for security analysis.

Figure 7:
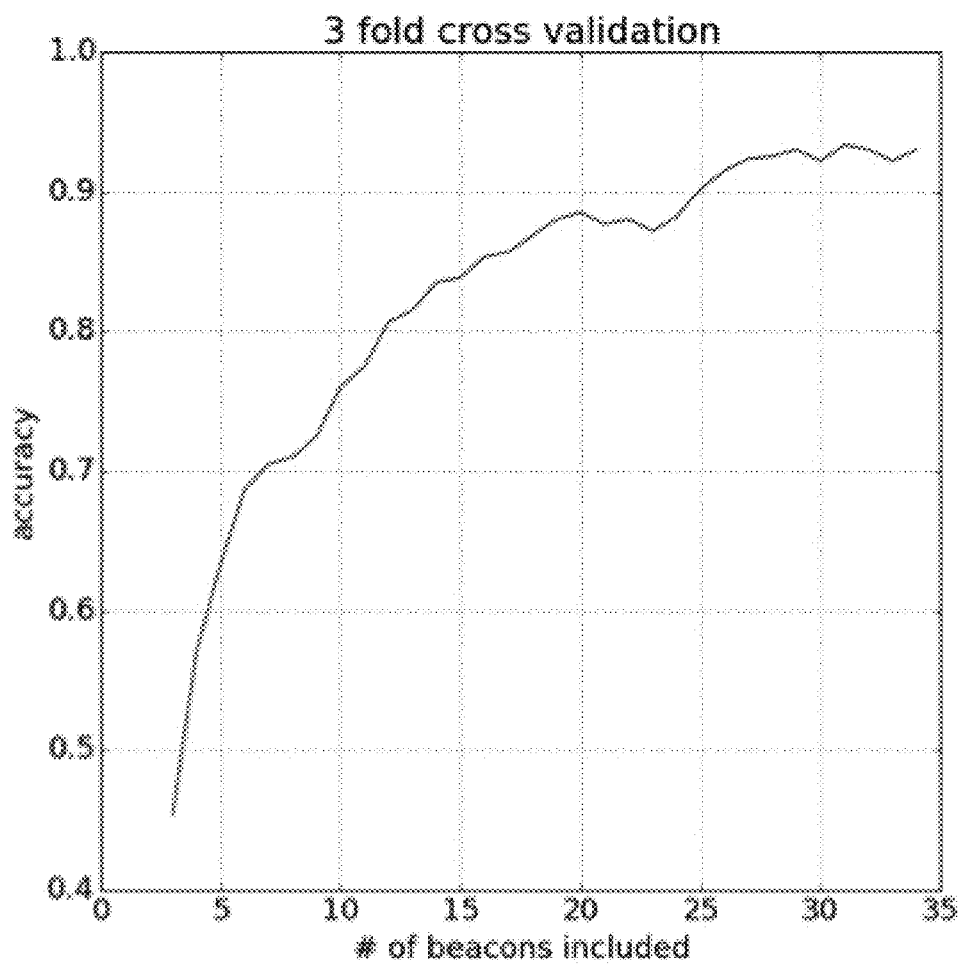
FIG. 7 shows the 3-fold cross validation accuracy variation as the number of beacons available to the location classification engine is varied to illustrate this tradeoff.

Despite the low cost of the beacons 101 employed, another test was conducted at a lower spatial beacon density by pruning beacons from the data set and repeating the analysis. For this, beacons were greedily removed based on their spatial locations so as to minimize the average distance between the centroid of each location and any remaining beacon. The simple idea is to maintain spatial coverage over a range of beacon densities. FIG. 7 shows the 3-fold cross validation accuracy variation as the number of beacons 101 available to the LCE is varied to illustrate this tradeoff.

Figure 8:
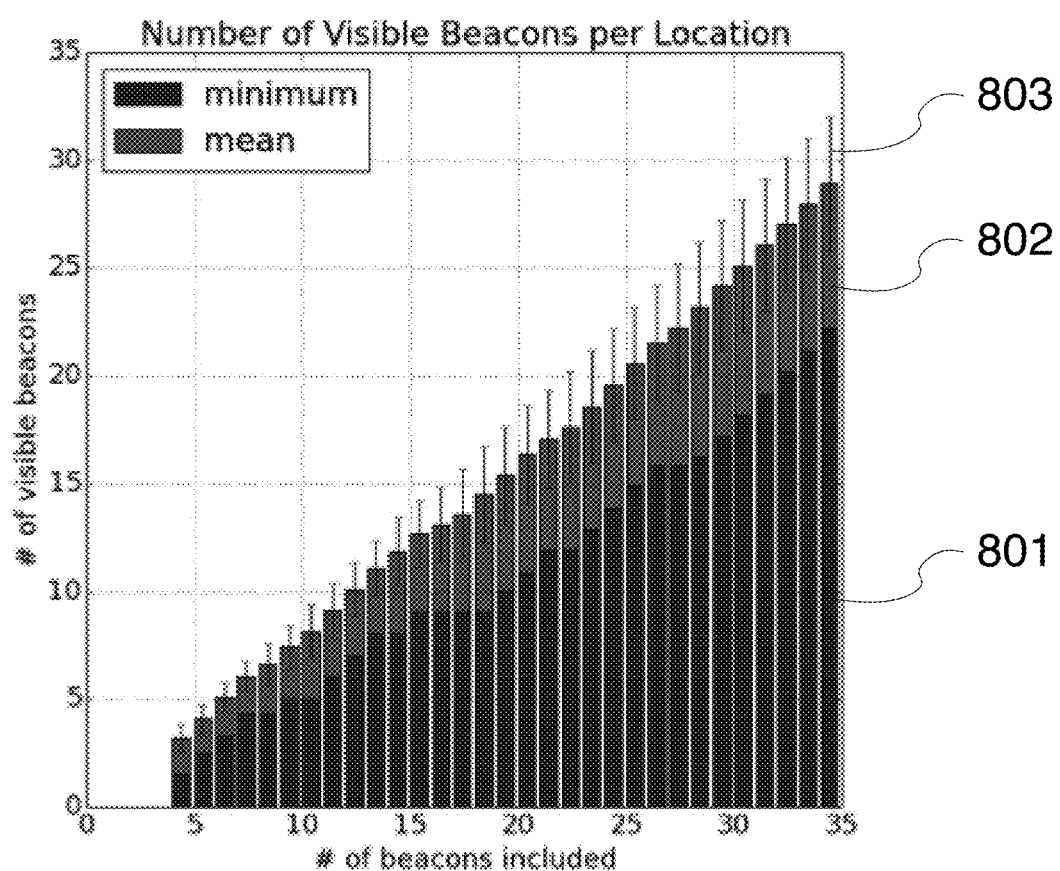
FIG. 8 illustrates the statistics showing dependence of a number of visible beacons as a function of a number of total available beacons at the location.

Using the same simulation approach, statistics were re-computed for the number of visible beacons per location. Here again, the number of visible beacons per-scan, per-location have been averaged. Then, the final statistics over the set of locations has been computed. The results as the number of available beacons 101 is varied are shown in FIG. 8 in which the minimum and mean values are depicted by bars 801 and 802, respectively. The standard deviation is indicated by bars 803.

Security Analysis

Now the description terns to how the protocols described herein can protect against replay, context-guessing, and wormhole attacks, and to addressing the combinations of protocols that can be used to produce unforgeable proofs of indoor location in the settings parameterized by the location taxonomy outlined earlier in this description.

Replay and Context-Guessing Attacks

In one or more embodiments, cryptographically varying the minor IDs advertised by the network of smart beacons 101 provides sufficient entropy to protect against replay and context-guessing attacks. In particular, the collision-resistance property of the underlying cryptographic hash function (SHA1) used by the localization system 100 ensures that all minor numbers will change at each update, which prevents naive attacks that simply replay old scan reports.

As shown in FIG. 7, achieving >90% accuracy in the localization system 100 within the building shown in FIG. 6 requires a network of at least 26 smart beacons 101. Under these circumstances, FIG. 8 shows that a mean of 21 beacons 101 (minimum of 15) are visible any given location. This means that a scan report will contain a mean of 336 (minimum of 240) bits that randomize at each beacon update. The pre-image resistance property of the underlying cryptographic hash function used by the localization system 100 ensures that the master key used to randomize the minor numbers cannot be discovered by observing the sequences of minor numbers advertised by the beacons 101. Without this master key, new minor numbers cannot be predicted in a systematic manner. As a result, context-guessing attacks will succeed with an average probability of $1/2^{336}$ (minimum of $1/2^{240}$).

Wormhole Attacks

In one or more embodiments, the combination of randomized minor numbers and NFC device localization is sufficient to prevent wormhole attacks in which an individual on-site colludes with an adversary off-site to create a forged proof of location. Provided that client devices 106 do not share private keys—a reasonable assumption if these keys are used for purposes outside of the localization system 100, e.g., signing purchase orders—the first two messages of the protocol described in FIG. 5 create a binding between the client device 106 and a (coarse) physical space: the nonce n is unpredictable and the signature generated by the client device 106 must be returned within a time window that precludes collusion with an off-site adversary. The ticket returned by the NFC station (message 3) then binds the client device's identity to the NFC station's coarse location at the time ts. During the client device's request for a proof of location (message 4), the central server 104 can ensure that the client device 106 signing the location request matches the client device's identity in the NFC ticket. If the timestamp in the ticket is recent and the scan report generated by the client device 106 has accurate minor numbers, the client device can be assured to be coarsely on-site and observing recent BLE advertisements, so a fine-grained location can be classified and returned by the localization system 100 (message 5).

TABLE 2

|  |  | Trusted | Replay | Untrusted |
|---|---|---|---|---|
| Identifiable | Immediate | BS | RS | RNS |
|  | Retroactive | BS | RS | RNS |
| Masked | Immediate | B | BR |  |
|  | Retroactive | B | BR |  |

Scenario Coverage

Table 2 summarizes the exemplary scenarios in which the localization system 100 can create unforgeable proofs of fine-grained, indoor location using the protocols described herein. In this table, B denotes the base beaconing protocol (no randomization), R denotes the randomized beaconing protocol, N denotes the NFC protocol, and S denotes the variants of these protocols that include client device's signatures on localization requests. In the S-T-*-* settings, the base protocol can be used to localize client devices 106, as client devices are trusted not to replay, context guess, or collude. If client device identifiablity is required, client device signatures should be used (as in FIG. 4), otherwise these can be omitted to allow client devices 106 to remain masked (as in FIG. 3). In the S-R-*-* settings, the addition of randomized minors will ensure that replay and context guessing attacks can be prevented as discussed above; signatures can, again, be used if client identifiability is required. Finally, the S-U-I-* settings can be addressed by using randomized minors in conjunction with our NFC-based protocol, as discussed above. In all settings, location proofs contain a signed timestamp indicating their time of issuance by localization system 100; as such, they can be used either immediately or retroactively.

In various embodiments, as illustrated by Tables 1 and 2, many different applications may be supported by the localization system 100. In a workplace setting, the localization system 100 could enable many new forms of access control to virtual assets like digital documents. Document viewing applications that leverage the localization system 100 could provide fine-grain controls over not only who has access to a document, but also where documents can be viewed. For instance, viewing of personnel documents could be restricted to individuals in Human Resources and only when they are in their assigned offices. Access from open spaces, like break rooms, could be prevented. Such controls could prove valuable as more and more documents are viewed and managed on mobile phones and tablets.

In one or more embodiments, beyond virtual access control, the localization system 100 could enable new applications for physical access control. For instance, when coupled with a network-enabled door lock, the localization system 100 could enable office owners to provide access to other colleague with the assurance that the colleague can only access the office when he or she is physically present. There are also similar applications of the localization system 100 to asset control and inventory management.

While these applications demonstrate new opportunities enabled by the localization system 100, it is important to point out that limitations exist. One burdensome limitation comes from the underlying location classification technique. While it is high in accuracy, deployment requires that a fingerprint be collected from each room/location in which the system is expected to classify. The indoor location research community has proposed several methods for reducing this burden, including modeling the fingerprints as described, for example, in Li, L. Shen, G., Zhao, C., Moscibroda, T., Lin, J. H., Zhao, F. Experiencing and handling the diversity in data density and environmental locality in an indoor positioning service. In Proceedings of the 20th annual international conference on Mobile computing and networking (MobiCom 2014). pp. 459-470, and crowd sourced, interactive labeling of ground truth as described, for example, in Bolliger, P. Redpin—adaptive, zero-configuration indoor localization through user collaboration. In Proceedings of the ACM international workshop on Mobile entity localization and tracking in GPS-less environments. (MELT 2008). pp. 55-60.

In one or more embodiments, fingerprinting could be avoided altogether if location precision constraints are relaxed. Specifically, the location classification could simply be a function of receiving advertising packets from n required beacons. Thus, if a client device 106 is within range of the required beacons 101 the location proof protocols above could still apply. However, location would be coarse, and the system could only restrict access to zones or portions of a location (e.g. a particular wing or floor of a building).

Computing Platforms

Figure 9:
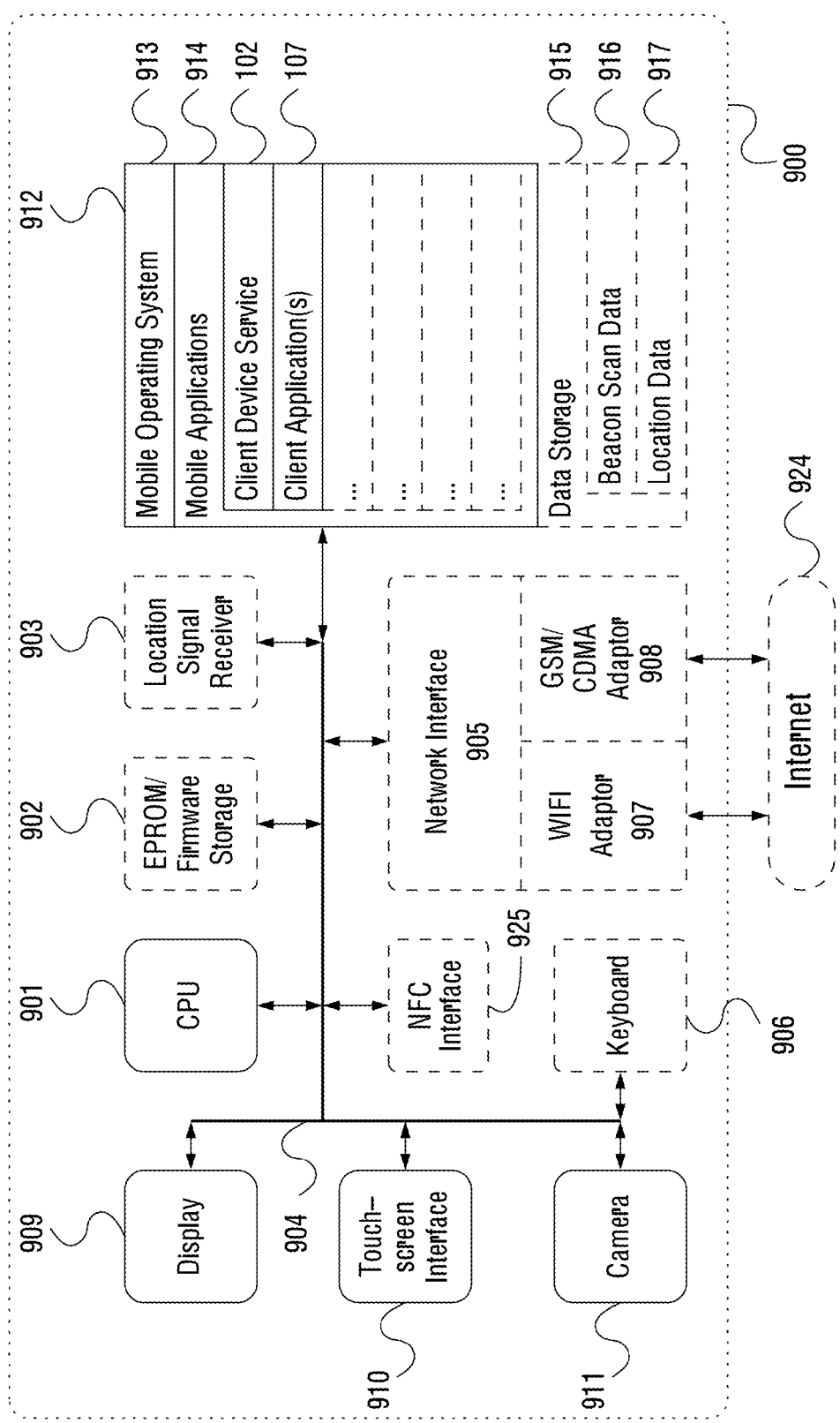
FIG. 9 illustrates an exemplary embodiment of a computerized mobile system that could be used as the client device in connection with the localization system illustrated in FIG. 1.

FIG. 9 illustrates an exemplary embodiment of a computerized mobile system 900 that could be used as the client device 106 in connection with the localization system 100 illustrated in FIG. 1. In one or more embodiments, the computerized mobile system 900 may be implemented within a form factor of a mobile computing device, such as a smartphone, a personal digital assistant (PDA), a tablet computer, or a smart watch, all of which are widely available commercially and are well known to persons of skill in the art.

The computerized system 900 may include a data bus 904 or other interconnect or communication mechanism for communicating information across and among various hardware components of the mobile computerized system 900, and a central processing unit (CPU or simply processor) 901 coupled with the data bus 904 for processing information and performing other computational and control tasks. Computerized system 900 also includes a memory 912, such as a random access memory (RAM) or other dynamic storage device, coupled to the data bus 904 for storing various information as well as instructions to be executed by the processor 901. The memory 912 may also include persistent storage devices, such as a magnetic disk, optical disk, solid-state flash memory device or other non-volatile solid-state storage devices.

In one or more embodiments, the memory 912 may also be used for storing temporary variables or other intermediate information during execution of instructions by the processor 901. Optionally, computerized system 900 may further include a read only memory (ROM or EPROM) 902 or other static storage device coupled to the data bus 904 for storing static information and instructions for the processor 901, such as firmware necessary for the operation of the computerized system 900, basic input-output system (BIOS), as well as various configuration parameters of the computerized system 900.

In one or more embodiments, the computerized system 900 may incorporate a display device 909, which may be also coupled to the data bus 904, for displaying various information to a user of the computerized system 900. In an alternative embodiment, the display device 909 may be associated with a graphics controller and/or graphics processor (not shown). The display device 909 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 909 may be incorporated into the same general enclosure with the remaining components of the computerized system 900. In an alternative embodiment, the display device 909 may be positioned outside of such enclosure.

In one or more embodiments, the computerized system 900 may further incorporate an near field communication (NFC) interface 925 connected to the data bus 904 and configured to communicate with one or more NFC devices in the building as described above.

In one or more embodiments, the computerized system 900 may incorporate one or more input devices, such as a touchscreen interface 910 for receiving tactile commands, a camera 911 for acquiring still images and video of various objects, such as user's faces or room surroundings, as well as a keyboard 906, which all may be coupled to the aforesaid data bus 904 for communicating information, including, without limitation, images and video, as well as user command selections to the processor 901. In an alternative embodiment, input devices may include a system for tracking eye movements of the user (not shown), which may be used to indicate to the computerized system 900 the command selection by the user.

In one or more embodiments, the computerized system 900 may additionally include a location signal receiver 903 configured to perform scan for beacons 101 and supply scan data described above to the processor 901 via the data bus 904.

In one or more embodiments, the computerized system 900 may additionally include a communication interface, such as a network interface 905 coupled to the data bus 904. The network interface 905 may be configured to establish a connection between the computerized system 900 and the Internet 924 using at least one of WIFI interface 907 and the cellular network (GSM or CDMA) adaptor 908. The network interface 905 may be configured to provide a two-way data communication between the computerized system 900 and the Internet 924. The WIFI interface 907 may operate in compliance with 802.11a, 802.11b, 802.11g and/or 802.11n protocols as well as Bluetooth protocol well known to persons of ordinary skill in the art. In an exemplary implementation, the WIFI interface 907 and the cellular network (GSM or CDMA) adaptor 908 send and receive electrical or electromagnetic signals that carry digital data streams representing various types of information. For example, the aforesaid networking components may be used to establish a network data connection between the computerized system 900 and other components of the localization system 100, such as the central server 104 and third party services/applications 108.

In one or more embodiments, the Internet 924 typically provides data communication through one or more subnetworks to other network resources. Thus, the computerized system 900 is capable of accessing a variety of network resources located anywhere on the Internet 924, such as web servers, other content servers as well as other network data storage resources. In one or more embodiments, the computerized system 900 is configured send and receive messages, media and other data, including application program code, through a variety of network(s) including Internet 924 by means of the network interface 905. In the Internet example, when the computerized system 900 acts as a network client, it may request code or data for an application program executing on the computerized system 900. Similarly, it may send various data or computer code to other network resources.

In one or more embodiments, the computerized system 900 uses the network interface 905 to send request(s), via the Internet 924, such as HTTP requests, to the central server 104 and receive various information, including, without limitation, the aforesaid location information and the timestamp, therefrom.

In one or more embodiments, the functionality described herein is implemented by computerized system 900 in response to processor 901 executing one or more sequences of one or more instructions contained in the memory 912. Such instructions may be read into the memory 912 from another computer-readable medium. Execution of the sequences of instructions contained in the memory 912 causes the processor 901 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 901 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 901 for execution. For example, the instructions may initially be carried on a magnetic disk from a remote computer. Alternatively, a remote computer can load the instructions into its dynamic memory and send the instructions over the Internet 924. Specifically, the computer instructions may be downloaded into the memory 912 of the computerized system 900 from the foresaid remote computer via the Internet 924 using a variety of network data communication protocols well known in the art.

In one or more embodiments, the memory 912 of the computerized system 900 may store any of the following software programs, applications or modules:

1. Operating system (OS) 913, which may be a mobile operating system for implementing basic system services and managing various hardware components of the computerized system 900. Exemplary embodiments of the operating system 913 are well known to persons of skill in the art, and may include any now known or later developed mobile operating systems.

2. Mobile applications 914 may include, for example, a set of software applications executed by the processor 901 of the computerized system 900, which cause the computerized mobile system 900 to perform certain predetermined functions, such as receive the beacon signals as described above. In one or more embodiments, the mobile applications 914 may include, for example, the client device service 102 as well as one or more client applications 107, see FIG. 1.

3. Data storage 915 may be used, for example, for storing the bacon scan data 916 as well as location data 917 of the computerized mobile system 900.

Figure 10:
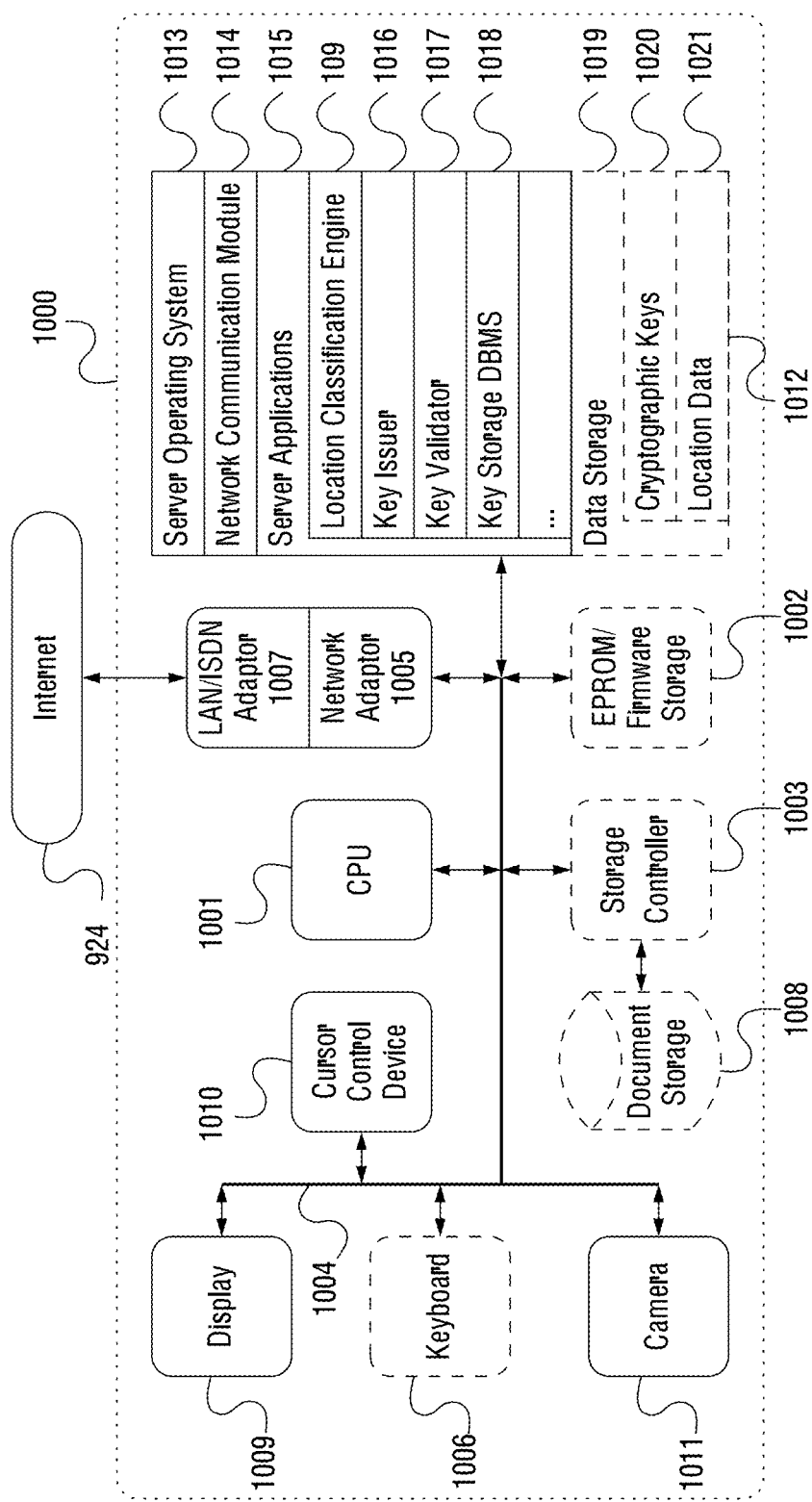
FIG. 10 illustrates an exemplary embodiment of a computerized server system, which could be used, for example, as the central server of the localization system shown in FIG. 1.

FIG. 10 illustrates an exemplary embodiment of a computerized server system 1000 which could be used, for example, as the central server 104 of the localization system 100 shown in FIG. 1. It should be noted that other components of the localization system 100, including, without limitation, the cloud beacon agent 105, may be also deployed based on the computerized server system 1000.

In one or more embodiments, the computerized server system 1000 may incorporate a data bus 1004, which may be substantially similar and may perform substantially similar functions as the data bus 1004 of the computerized system 900 illustrated in FIG. 9. In various embodiments, the data bus 1004 may use the same or different interconnect and/or communication protocol as the data bus 904. The one or more processors (CPUs) 1001, the network adaptor 1005, the EPROM/Firmware storage 1002, the display device 1009 and the keyboard 1006 of the computerized server system 1000 may be likewise substantially similar to the respective processor 901, the network interface 905, the EPROM/Firmware storage 902, the display device 909 and the keyboard 906 of the computerized system 900, except that the former components are deployed in a server platform configuration. In various implementations, the one or more processor 1001 may have substantially increased processing power as compared with the processor 901.

In addition to the input device 1006 (keyboard), the computerized server system 1000 may additionally include a cursor control device 1010, such as a mouse, a trackball, or cursor direction keys for communicating direction information and command selections to processor 1001 and for controlling cursor movement on the display device 1009. This input device typically has two degrees of freedom in two axes, a first axis (e.g., x) and a second axis (e.g., y), that allows the device to specify positions in a plane.

The LAN/ISDN adaptor 1007 of the computerized server system 1000 may be implemented, for example, using an integrated services digital network (ISDN) card or a modem to provide a data communication connection to a corresponding type of telephone line, which is interfaced with the Internet 924 using Internet service provider's hardware (not shown). As another example, the LAN/ISDN adaptor 1007 may be a local area network interface card (LAN NIC) to provide a data communication connection to a compatible LAN and the Internet 924. To store various media files, the computerized server system 1000 may be provided with document storage 1008, for storing various content to be displayed to the user by means of a storage controller 1003. The camera 1011 may be used to acquire images and/or video of various objects.

In one or more embodiments, the memory 1012 of the computerized server system 1000 may store any of the following software programs, applications, modules and/or data:

1. A server operating system (OS) 1013, which may be an operating system for implementing basic system services and managing various hardware components of the computerized server system 1000. Exemplary embodiments of the server operating system 1013 are all well known to persons of skill in the art, and may include any now known or later developed operating systems.

2. A network communication module 1014 may incorporate, for example, one or more network protocol stacks which are used to establish a networking connection between the computerized server system 1000 and the various network entities of the Internet 924, such as the computerized mobile system 900, using the network adaptor 1005 working in conjunction with the LAN/ISDN adaptor 1007.

3. Server applications 1015 may include, for example, a set of software applications executed by one or more processors 1001 of the computerized server system 1000, which cause the computerized server system 1000 to perform certain predetermined functions or tasks. In one or more embodiments, the server applications 1015 may include the location classification engine 109, the key issuer 1016, as well as the key validator 1017. Additionally provided may be a database management system 1018 for storing cryptographic keys used by the location system 100

4. Data storage 1019 may be used, for example, for storing the cryptographic keys 1020 as well as location data 1021, described above, which may be stored in a form of database tables.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in various localization systems and methods. It is intended that the specification and examples be considered as exemplary only, with a true scope and spirit of the invention being indicated by the following claims.

What is claimed is:

1. A computer-implemented method, the method being performed in a computerized system comprising a central processing unit, a localization signal receiver and a memory, the computer-implemented method comprising:
   a. receiving at least one localization signal using the localization signal receiver, wherein the at least one localization signal comprises a randomly generated key;
   b. measuring a strength of the received localization signal;
   c. using the central processing unit to extract the randomly generated key from the received localization signal;
   d. determining a location based at least on the measured strength of the received localization signal; and
   e. validating the determined location using the extracted randomly generated key.

2. The computer-implemented method of claim 1, wherein the key is unique.

3. The computer-implemented method of claim 1, wherein the received localization signal is provided by a beacon disposed in a room of a building and wherein a second randomly generated key is periodically sent to the beacon.

4. The computer-implemented method of claim 3, wherein validating the determined location comprises comparing the key extracted from the received localization signal with the second randomly generated key previously sent to the beacon, wherein the determined location is invalidated if the key and the second key are not the same.

5. The computer-implemented method of claim 4, wherein validating the determined location is performed on a server and wherein the server is configured to randomly generate the second key and cause the second randomly generated key to be sent to the beacon.

6. The computer-implemented method of claim 5, wherein the second randomly generated key is periodically sent to the beacon by a beacon agent, the beacon agent being communicatively coupled with the server.

7. The computer-implemented method of claim 4, wherein validating the determined location further comprises validating a ticket issued by a near field communication (NFC) device, wherein the determined location is further invalidated if the ticket is invalid.

8. The computer-implemented method of claim 7, wherein the ticket is issued by a near field communication (NFC) device in response to receiving a nonce signed using a private key.

9. The computer-implemented method of claim 7, wherein the nonce is randomly generated and transmitted by the near field communication (NFC) device and wherein the method further comprises receiving the nonce and signing the received nonce using the private key.

10. The computer-implemented method of claim 1, wherein the received localization signal is provided by a beacon disposed in a room of a building and wherein the received localization signal comprises an identifier uniquely identifying the beacon.

11. The computer-implemented method of claim 10, wherein determining and validating the location comprises transmitting the beacon identifier, the measured strength of the received localization signal and the extracted key to a central server and receiving the determined location from the central server.

12. The computer-implemented method of claim 11, wherein an identity of the computerized system or a user of the computerized system is not provided to the central server.

13. The computer-implemented method of claim 11, wherein the determined location received from the central server is signed with a private key of the central server.

14. The computer-implemented method of claim 11, wherein the determined location is received from the central server together with a current timestamp.

15. The computer-implemented method of claim 1, wherein the received localization signal is provided by a beacon disposed in a room of a building, wherein the localization signal comprises a major identifier uniquely identifying the beacon and a minor identifier, the minor identifier comprising the key that has been randomly generated.

16. The computer-implemented method of claim 1, wherein the location is determined with a room-level accuracy.

17. The computer-implemented method of claim 1, wherein receiving at least one localization signal using the localization signal receiver comprises receiving a plurality of localization signals provided by a plurality of beacons disposed within a building and wherein the location is determined based on the received plurality of localization signals.

18. A non-transitory computer-readable medium embodying a set of computer-executable instructions, which, when executed in connection with a computerized system comprising a central processing unit, a localization signal receiver, a display and a memory, cause the computerized system to perform a method comprising:
   a. receiving at least one localization signal using the localization signal receiver, wherein the at least one localization signal comprises a randomly generated key;
   b. measuring a strength of the received localization signal;

c. using the central processing unit to extract the randomly generated key from the received localization signal;
d. determining a location based at least on the measured strength of the received localization signal; and
e. validating the determined location using the extracted randomly generated key.

19. A computerized system comprising a central processing unit, a localization signal receiver and a memory, the memory storing a set of computer-readable instructions causing the computerized system to perform a method comprising:

a. receiving at least one localization signal using the localization signal receiver, wherein the at least one localization signal comprises a randomly generated key;
b. measuring a strength of the received localization signal;
c. using the central processing unit to extract the randomly generated key from the received localization signal;
d. determining a location based at least on the measured strength of the received localization signal; and
e. validating the determined location using the extracted randomly generated key.

* * * * *